A. BEZNER.
MACHINE FOR BARKING TREE TRUNKS.
APPLICATION FILED JULY 20, 1914.

1,172,762.

Patented Feb. 22, 1916.
5 SHEETS—SHEET 1.

WITNESSES
May G. Luttrell
Maurice R. Baker

INVENTOR
A. Bezner
BY G. Croydon Marks
ATTORNEY

A. BEZNER.
MACHINE FOR BARKING TREE TRUNKS.
APPLICATION FILED JULY 20, 1914.
1,172,762.
Patented Feb. 22, 1916.
5 SHEETS—SHEET 2.
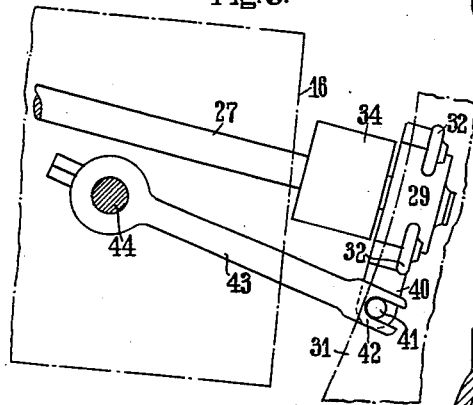
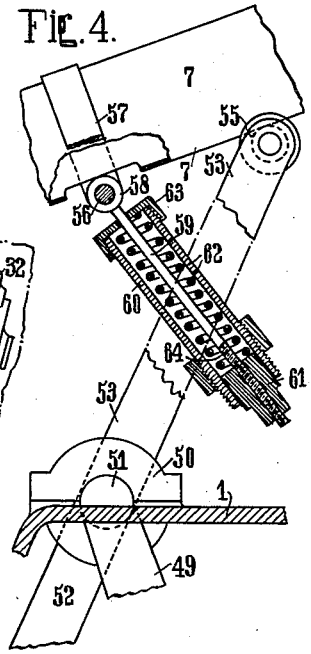
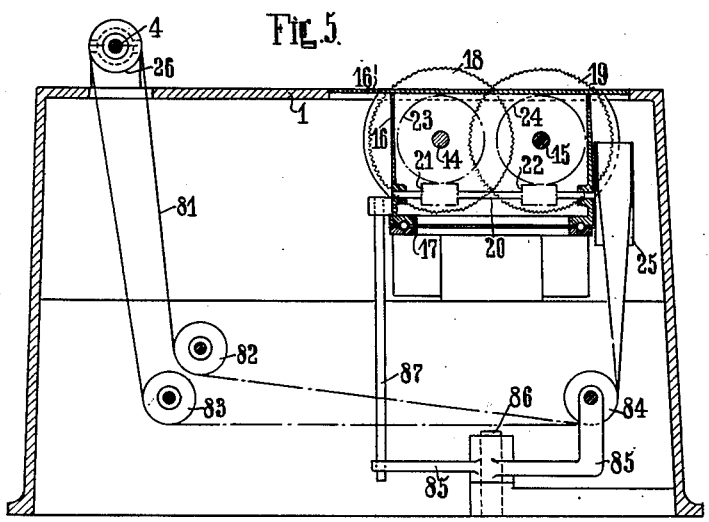
WITNESSES
May G Luttrell
Maurice Baker
A. Bezner
INVENTOR
BY G Croydon Marks
ATTORNEY

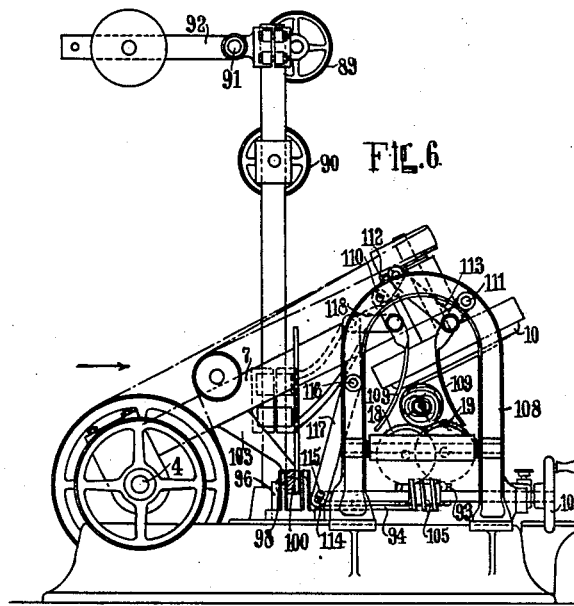
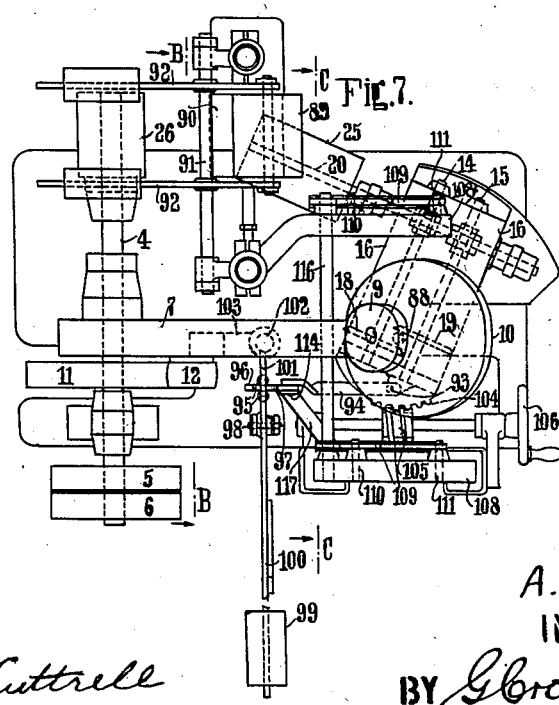

A. BEZNER.
MACHINE FOR BARKING TREE TRUNKS.
APPLICATION FILED JULY 20, 1914.
1,172,762.
Patented Feb. 22, 1916.
5 SHEETS—SHEET 4.
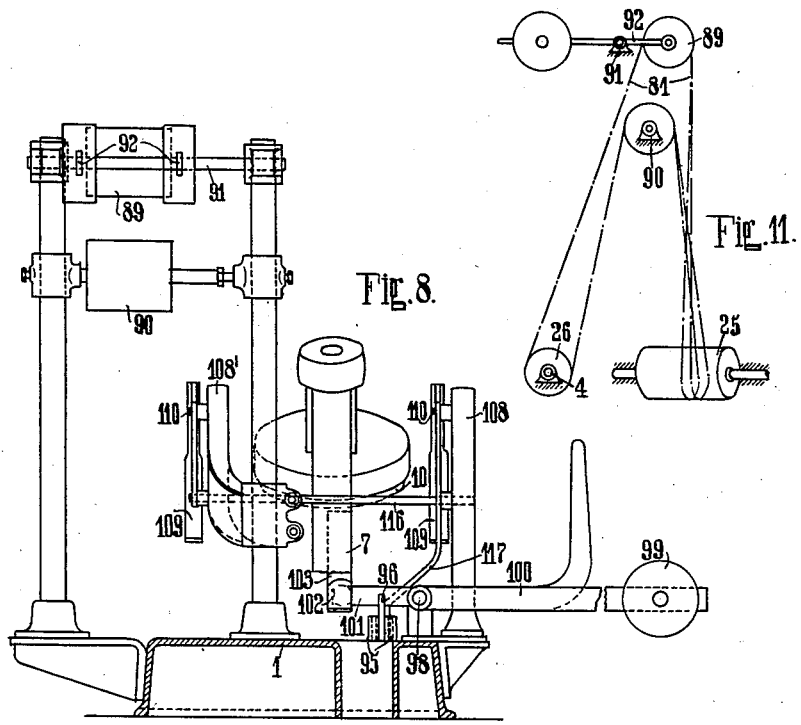
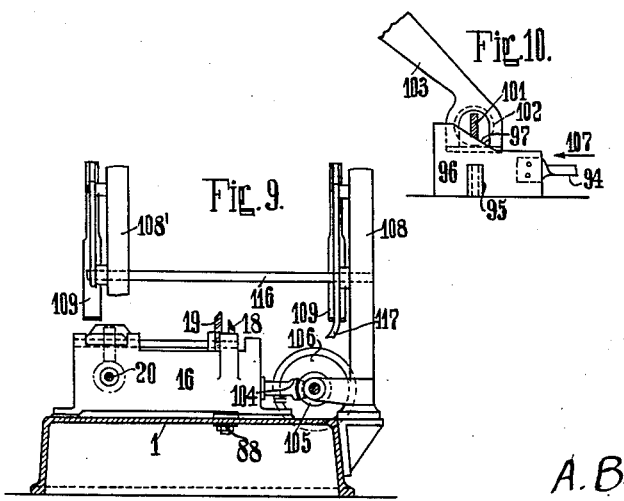
WITNESSES
May G. Luttrell
Maurice Baker
A. Bezner
INVENTOR
BY G. Croydon Marks
ATTORNEY

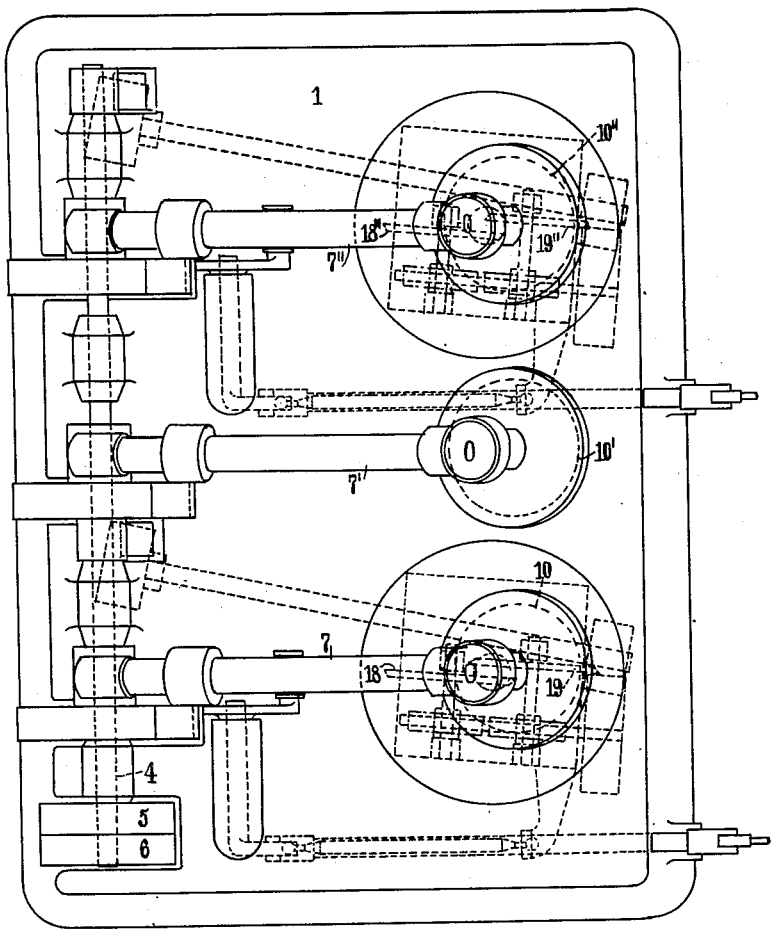

UNITED STATES PATENT OFFICE.

ALBERT BEZNER, OF RAVENSBURG, GERMANY.

MACHINE FOR BARKING TREE-TRUNKS.

1,172,762.  Specification of Letters Patent.  Patented Feb. 22, 1916.

Application filed July 20, 1914. Serial No. 851,946.

*To all whom it may concern:*

Be it known that I, ALBERT BEZNER, a subject of the Emperor of Germany, and residing at Ravensburg, Wurttemberg, Germany, have invented certain new and useful Improvements in Machines for Barking Tree-Trunks, of which the following is a specification.

My invention relates to improvements in machines for barking tree-trunks in which the trunk to be barked is drawn under the flat conical knife-head by means of tappet or serrated wheels in such a manner that every point on the surface of the trunk describes a spiral motion.

The principal feature of the subject of the invention consists therein that the rotating shaft of the knife-head is mounted on an oscillating arm aslant to the horizontal driving shaft of the machine, the oscillating arm being swingable about the said driving shaft, so that the shaft of the knife-head lies at right angles to the driving shaft. Consequently the knife-head assumes a more or less slanting position according to the thickness of the wood which has to be barked.

Further features of the invention consist in the method of driving as well as in the automatic adjustment of the serrated wheels and in the guiding of the trunk by means of automatically adjustable guides.

The subject of the invention is illustrated by the accompanying drawings in several forms of construction.

Figure 1:
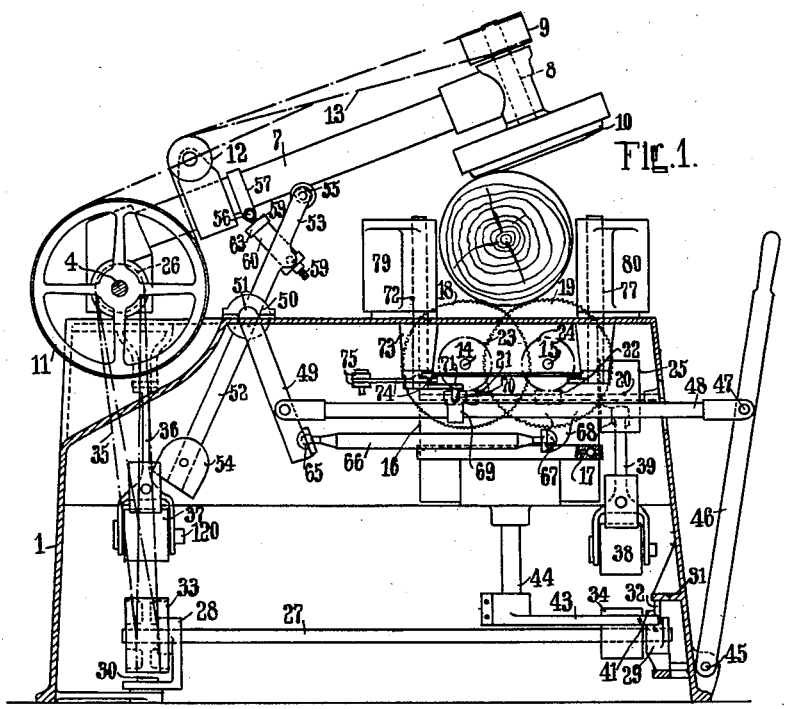
Figure 2:
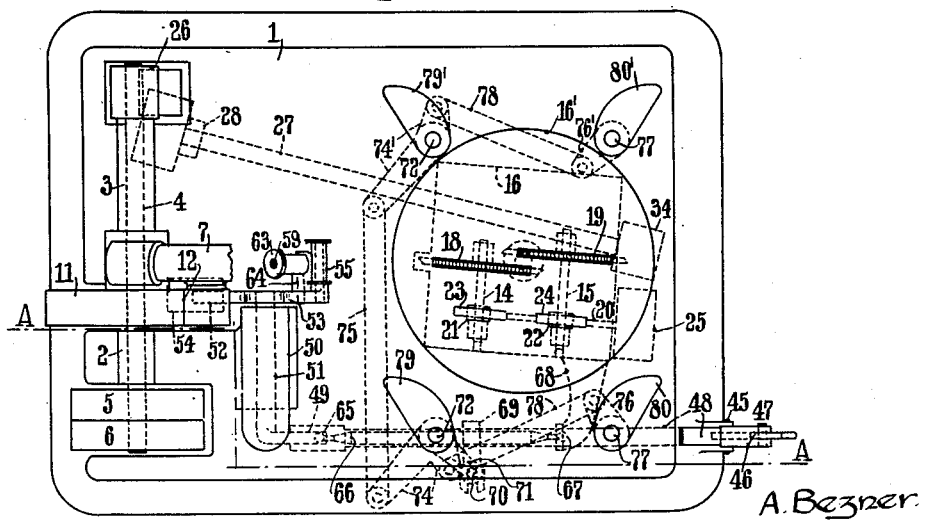

Figures 1–4 show the first form of construction. Fig. 1 is a section on line A—A of Fig. 2, while Fig. 2 shows a plan of the machine, Figs. 3 and 4 each show a detail of this form of construction, Fig. 5 shows the second form of construction in vertical section, Figs. 6–11 shows the third form of construction. Fig. 6 is a side elevation and Fig. 7 a plan of the third form of construction of the machine, Fig. 8 is a section on line B—B of Fig. 7, Fig. 9 is a section on line C—C of Fig. 7, Fig. 10 shows to a larger scale a detail of the third form of construction, namely the slide which serves as a stop, Fig. 11 shows diagrammatically to a somewhat smaller scale than Figs. 6–9 a second detail of the third form of construction, namely the arrangement of the driving belt, Fig. 12 shows a fourth form of construction with several knife-heads arranged one behind the other.

As can be seen from the drawing, the driving shaft 4 is mounted in the machine frame 1 at 2 and 3, said driving shaft being provided with the driving pulley 5 and the loose pulley 6. On the shaft 4 there is swingably mounted the oscillating arm 7, which can be combined with a counterweight lever. In the oscillating arm 7 is rotatably mounted the shaft 8 which is provided at one end with the pulley 9 and connected at the other end to the slightly conical knife-head 10. The pulley 11 is fixed on the shaft 4 and the guide pulley 12 is rotatably mounted on the oscillating arm 7. The belt 13 running over the pulley 11 (Fig. 1) transmits the motion of same to the pulley 9 and then returns over the guiding pulley 12 to the pulley 11.

The bracket 16 on which are mounted the serrated wheel shafts 14 and 15 rests by means of a ball bearing on the surface 17 of the machine frame and is rigidly connected to the cover plate 16', as can best be seen in the machine frame of the second form of construction, as shown in Fig. 5. On the shafts 14, 15 are mounted the serrated wheels 18, 19. The latter lie closely side by side, so that they overlap and impart a spiral motion to the circular trunk extending obliquely above them. The shaft 20 which is also rotatably mounted in the bracket 16 serves for driving the serrated wheel shafts 14, 15. The worms 21, 22 are fixed on the side shafts 20 which engage with the worm wheels 23, 24 fixed on the shafts 14, 15. On the driving shaft 4, the pulley 26 is fixed and on the shaft 20 is provided the pulley 25. The transmission of the motion from the driving shaft 4 to the driving shaft 20 is effected by the shaft 27, the position of which is adjustable, said shaft being mounted in the machine bed and rotatably mounted in the bearings 28, 29 (Figs. 1 and 3). The bearing 28 is rotatable about the pivot 30, while the bearing 29 is movable along the flange-shaped portion 31 of the machine bed by means of its rollers 32. When the said rollers are moved, the shaft 27 must swing about the pivot 30.

On the shaft 27 are fixed the pulleys 33 and 34. The former is driven from the pulley 26 on the driving shaft by means of the belt 35 which is tensioned by means of the pulley 37 rotatably mounted on the pin 120 of the fork-shaped weighted lever 36. The rotation of the shaft 27 is transmitted to the pulley 25 of the shaft 20 by means of the pulley 34 through the medium of a belt. This belt is tensioned in the same manner as the belt 35 by means of a jockey pulley 38 which is mounted on the pin of the forked weighted lever 39.

To the bearing 29 (Fig. 3) there is rigidly connected an arm 40 to which the pin 41 is fixed. The latter is embraced by the fork 42 of the arm 43, which is rigidly connected to the pin 44 attached to the bracket 16.

A lever 46 is pivoted at 45, the controlling rod 48 engaging said lever 46 at 47. The said controlling rod is jointedly connected to the arm 49 which is rigidly connected to the shaft 51 rotatably mounted at 50. On the shaft 51 is fixed the double lever 52, 53, the arm 52 of which is provided with the counter-weight 54 and the arm 53 bearing against the oscillating arm 7 by means of the roller 55.

The pin 56 (Figs. 1 and 4) is fixed in the clamp 57 of the oscillating arm 7 and passes through the eye 58 of the rod 59, the latter being connected to the piston 61 guided in the casing 60. The spring 62 contained in the casing 60 bears at one end against the piston 61 and at the other end against the cover 63. The casing is jointedly connected to the double lever 53, 52 by means of the pin 64. The spring 62 has the tendency to pull the oscillating arm 7 against the stop 55. When the oscillating arm is drawn away from the stop, the spring is compressed.

The rod 66 is jointedly connected to the arm 49 at 65 by means of a spherical joint, said rod 66 being connected to the arm 68 of the bracket 16 by means of a spherical joint 67. On the controlling rod 48 there is fixed the fork 69 which embraces the pin 70 of the arm 71, the pin 72 of which is rotatably mounted in the machine frame at 73. The bell crank 74 is also rigidly connected with the pin 72. Opposite the bell crank 74, the bell crank 74' is swingably mounted in the machine frame by means of its pin 72'. Both bell cranks are in operative connection with one another by means of the rod 75. The levers 76, 76' are swingably mounted by means of their pins 77, 77' at two oppositely disposed points in the machine bed and are each jointedly connected by means of a rod 78 and 78' with the bell crank 74 and 74' respectively. On the pins 72, 72' and 77, 77' the guides 79, 79' and 80, 80' respectively are fixed.

When the lever 46 is turned somewhat in the one direction or the other about the pin 45, then this rotation is transmitted through the rod 48 to the arms 49, 52 and 53, so that the oscillating arm 7 is enabled to rise or sink as far as a certain limit. Simultaneously the bracket 16 is rotated by the rod 66 connected to the arm 49, so that a certain adjustment of the bracket 16 and skew setting of the serrated wheels 18 and 19 are obtained with a corresponding raising or lowering of the oscillating arm 7. Moreover, the pins 72, 72' and also 77, 77' together with the guides which are fixed to them are adjusted by the shifting of the rod 48 and of the fork 69, according to the thickness of the wood.

In the form of construction shown in Fig. 5, the movable shaft 27 for transmitting the motion from the driving shaft 4 to the driving shaft 20 of the bracket 16 is replaced by an endless belt 81 which runs over the guiding pulleys 82, 83 and 84 to the pulley 25. The guide pulley 84 is rotatably mounted in the fork of the lever 85 which is rotatable about the pin 86 fixed in the machine frame. The rotation of the arm 85 is effected by the bracket 16 which is connected to the arm 85 by means of a rod 87.

In the third form of construction shown in Figs. 6–11 the bracket 16 which carries the serrated wheel shafts 14, 15 as well as the driving shaft 20 is mounted rotatable about a pin 88.

The transmission of motion from the driving shaft 4 to the shaft 20 is effected by means of the belt 81 (Fig. 11) which runs over the pulleys 26, 89, 90 and 25 (Figs. 6 and 11), said belt being kept tensioned by the weighted lever 92 acting on the pulley 89 and mounted swingably at 91. The rod 94 is jointed to the bracket 16 at 93 (Fig. 7). Said rod 94 is jointedly connected to the slide 96 which is led between the rollers 95 (Figs. 7 and 10), said slide being provided at the top with the inclined surface 97. The lever 100 which is loaded with the weight 99 is swingably mounted at 98, the other arm 101 (Fig. 7) of said lever engaging by means of its spherical head 102 in the socket of the arm 103 attached to the oscillating arm 7. The socket of the arm 103 is open below, but is provided with a bow-shaped member which prevents the arm 103 from being separated from 101. The bracket 16 is provided with worm wheel teeth 104 (Fig. 7) with which the worm 105 engages, the shaft of the latter being rotatably mounted in the machine frame and carrying the handwheel 106.

According to the extent to which the bracket 16 is placed obliquely by turning the worm 105, the slide 96 is shifted in the direction of the arrow 107 (Fig. 10), which results in the arm 101 and at the same time also the arm 103 as well as the oscillating arm 7 with the knife-head 10 being able to sink accordingly. On each of the two brackets 108, 108' are swingably mounted two guides 109, (see e. g. Fig. 6 wherein the two guides 109 are jointedly connected to the bracket 108 at 110 and 111). The two guides jointedly connected to one bracket are operatively connected to one another by means of the hinge-bands 112, 113 in such a manner that when a swinging movement is imparted to one of the two guides, the other guide must describe the same swinging movement. For the automatic adjustment of the guide 109 according to the thickness of the wood, the pin 114 of the rod 94 engages in the slot 115 of the lever 117 which is rotatably mounted at 116. The latter is connected with one of the guides 109 by means of the hinge-band 118. When the bracket 16 is adjusted, the movement of the slide 96 is transmitted to the lever 117 through the pins 114 of the rod 94 and thence by means of the hinge-band 118 to the guides 109 which are adjusted according to the width of the wood.

A further development of the machine consists, as shown in Fig. 12, in having several knife-heads, e. g. three, 10, 10′, 10″, mounted one behind the other in such a manner that the oscillating arms 7, 7′, 7″ lie parallel to one another. The trunk of wood then arrives under the various knife-heads in succession. In this case there is arranged under each of the first and last knife-heads viz. 10 and 10″ respectively a special individually adjustable pair of serrated wheels 18, 19, 18″, 19″.

By the arrangement of several knife-heads one behind the other, a reduction of the speed of revolution of the serrated wheels is attained. For example, in the event of three knife-heads being placed one behind the other, the trunk requires to revolve at only one third of the speed which would be necessary if only one knife head were employed for the complete barking of the trunk. If in the case of heavy and even partly crooked trunks a slow rate of revolution is employed for the wheels, too high a speed for the wood and consequent running out of the true path of the same are avoided.

What I claim is:—

1. In a machine for barking tree-trunks, the combination, with the main horizontal driving shaft —4— of the machine, of an upwardly inclined oscillating arm —7— mounted on said main driving shaft, a cutter-head-shaft —8— carried by said oscillating arm and having its axis in a plane at right angles to the plane of the axis of the said main driving shaft, a flat conical cutter-head —10— mounted on the said cutter-head-shaft, means for transmitting rotary motion from said main driving shaft to said cutter-head-shaft, means for feeding the trunk forward under the cutter-head in such a manner to make every point of the surface of said trunk describe a spiral path, said feeding mechanism being mounted on a bracket —16— angularly adjustable on its vertical axis, and means for driving said feed-mechanism from said main driving shaft in a manner to allow of angular adjustment of said bracket.

2. In a machine for barking tree-trunks, the combination, with the main horizontal driving shaft —4— of the machine, of an upwardly inclined oscillating arm —7— mounted on said main driving shaft, a cutter-head-shaft —8— carried by said oscillating arm and having its axis in a plane at right angles to the plane of the axis of the said main driving shaft, a flat conical cutter-head —10— mounted on said cutter-head-shaft, means for transmitting rotary motion from said main driving shaft to said cutter-head-shaft, means for feeding the trunk forward under the cutter-head in such a manner to make every point of the surface of the said trunk describe a spiral path, said feeding mechanism being mounted on a bracket —16— angularly adjustable on its vertical axis, means for driving said feed-mechanism from said main driving shaft in a manner to allow of angular adjustment of said bracket, the said driving means consisting of an endless belt —81— passing from the main driving pulley —26— over guide-rollers and forming a loop to engage another pulley —25— for driving the feed-mechanism.

3. In a machine for barking tree-trunks, the combination, with the main horizontal driving shaft —4— of the machine, of an upwardly inclined oscillating arm —7— mounted on said main driving shaft, a cutter-head-shaft —8— carried by said oscillating arm and having its axis in a plane at right angles to the plane of the axis of the said main driving shaft, a flat conical cutter-head —10— mounted on said cutter-head-shaft, means for transmitting rotary motion from said main driving shaft to said cutter-head-shaft, means for feeding the trunk forward under the cutter-head in a manner to make every point of the surface of the said trunk describe a spiral path, said feeding mechanism being mounted on a bracket —16— angularly adjustable on its vertical axis, means for driving said feed-mechanism from said main driving shaft in a manner to allow of angular adjustment of said bracket, the said driving means consisting of a movably mounted shaft —27— susceptible of turning around a vertical axis.

4. In a machine for barking tree-trunks, the combination, with the main horizontal driving shaft of the machine, of an upwardly inclined oscillating arm —7— mounted on said main driving shaft, a cutter-head-shaft —8— carried by said oscillating arm and having its axis in a plane at right angles to the plane of the axis of the said main driving shaft, a flat conical cutter-head —10— mounted on said cutter-headshaft, means for transmitting rotary motion from said main driving shaft to said cutter-head-shaft, means for feeding the trunk forward under the cutter-head in a manner to make every point of the surface of the said trunk describe a spiral path, said feeding mechanism being mounted on a bracket —16— angularly adjustable on its vertical axis, means for driving said feeding mechanism from the said main driving shaft of the machine, in a manner to allow of angular adjustment of said bracket, and means for guiding the trunk, said guiding means being so constructed and arranged that their distance apart is controlled by the angular adjustment of the said bracket.

5. In a machine for barking tree-trunks, the combination, with the main driving shaft —4— of the machine, of an upwardly inclined oscillating arm —7— mounted on said main driving shaft, a cutter-head-shaft —8— carried by said oscillating arm and having its axis in a plane at right angles to the plane of the axis of said main driving shaft, a flat conical cutter-head —10— mounted on said cutter-head-shaft, means for transmitting motion from said main driving shaft to said cutter-head-shaft, means for feeding the trunk forward under the cutter-head in a manner to make every point of the surface of the trunk describe a spiral path, said feeding means being mounted on a bracket —16— angularly adjustable on its vertical axis, means for driving said feeding mechanism from the main driving shaft of the machine, in a manner to allow of angular adjustment of said bracket, and a stopping device, the position of which is controlled by the said angular adjustment of the bracket and which serves to limit the downward motion of the said oscillating arm —7—, thereby preventing the action of the cutter head against the trunk, until the bracket has reached its proper angular position.

6. In a machine for barking tree-trunks, the combination, with the main driving shaft —4— of the machine, of an upwardly inclined oscillating arm —7— mounted on said main driving shaft, a cutter-head-shaft —8— carried by said oscillating arm and having its axis in a plane at right angles to the plane of the axis of said main driving shaft, a flat conical cutter-head —10— mounted on said cutter-head-shaft, means for transmitting rotary motion from the said main driving shaft to said cutter-head-shaft, means for feeding the trunk forward under the cutter-head in a manner to make every point of the surface of the trunk describe a spiral path, said feeding means being mounted on a bracket —16— angularly adjustable on its vertical axis, means for driving said feeding mechanism from the said main driving shaft of the machine in a manner to allow of angularly adjusting the said bracket, a stopping device the position of which is controlled by the angular position of said bracket, and a spring —62— tending to draw the said oscillating arm —7— against the said stopping device.

7. In a machine for barking tree-trunks, the combination, with the main driving shaft —4— of the machine, of an upwardly inclined oscillating arm —7— mounted on said main driving shaft, a cutter-head-shaft carried by said oscillating arm and having its axis in a plane at right angles to the plane of the axis of the main driving shaft, a flat conical cutter-head-shaft —10— mounted on said cutter-head-shaft, means for transmitting rotary motion from the said main driving shaft to said cutter-head-shaft, means for feeding the trunk forward under the cutter-head in a manner to make every point of the surface of the trunk describe a spiral path, said feeding means being mounted on a bracket —16— angularly adjustable on its vertical axis, means for driving said feed-mechanism from the said main driving shaft of the machine in a manner to allow of angularly adjusting the said bracket, means for guiding the said trunk, the said guiding means and bracket and oscillating arm —7— being in positive operative connection with each other in such a manner, that the angular adjustment of said bracket causes simultaneous corresponding adjustment of said oscillating arm —7— and of the said guiding means.

In testimony whereof I have signed my name to this specification in the presence of two subscribing witnesses.

ALBERT BEZNER.

Witnesses:
ERNEST ENTENMANN,
FRIDA KLAIBER.